United States Patent
Beckemeyer et al.

(10) Patent No.: US 6,470,402 B1
(45) Date of Patent: Oct. 22, 2002

(54) INCREASING VALUES OF A READ AND A TRIGGER POINTERS WHEN A WRITE POINTER REACHES THE READ POINTER IN A CIRCULAR FIFO (FIRST-IN-FIRST-OUT) STORE

(75) Inventors: Heinz-Peter Beckemeyer, Oberhummel; Richard Oed, Erding; Manfred Christ, Freising, all of (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/430,261

(22) Filed: Oct. 29, 1999

(30) Foreign Application Priority Data

Nov. 3, 1998 (DE) .......................... 198 50 650

(51) Int. Cl.$^7$ .......................... G06F 13/10; G06F 3/05; G06F 5/06
(52) U.S. Cl. .......................... 710/52; 710/29
(58) Field of Search .......................... 710/29, 52–57, 710/310; 365/189.01, 189.04, 189.05

(56) References Cited

U.S. PATENT DOCUMENTS

| | | | |
|---|---|---|---|
| 4,700,391 A | * 10/1987 | Leslie et al. | 704/207 |
| 5,347,637 A | * 9/1994 | Halford | 710/316 |
| 5,696,940 A | * 12/1997 | Liu et al. | 345/558 |
| 5,706,203 A | * 1/1998 | Kawauchi | 324/121 R |
| 5,974,483 A | * 10/1999 | Ray et al. | 326/56 |

FOREIGN PATENT DOCUMENTS

EP     0 391 584 A2     3/1990

* cited by examiner

*Primary Examiner*—Jeffrey Gaffin
*Assistant Examiner*—Ilwoo Park
(74) *Attorney, Agent, or Firm*—William B. Kempler; W. James Brady; Frederick J. Telecky, Jr.

(57) ABSTRACT

For the transfer of data coming from N channels, which are sampled in a pre-determined sequence, to a processor by means of a circular FIFO store (30) with n storage stages, whilst retaining this pre-determined sequence, and whereby the output of the last stage is connected to the input of the first stage, the following steps are implemented:

Figure 1:
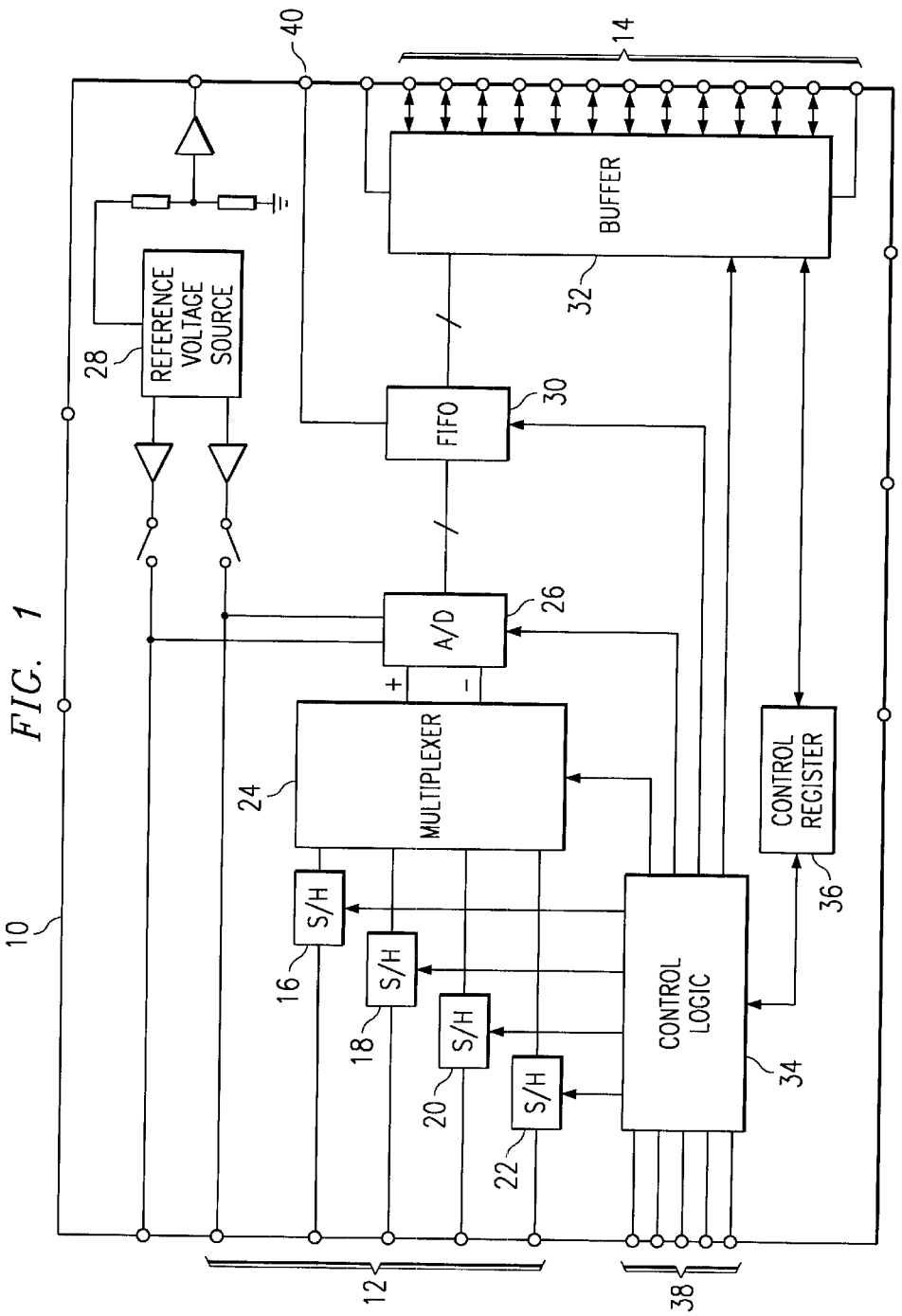

a) With each write operation of data into the FIFO store (30), a write pointer (SZ) is set to a value which designates the storage stage into which has been written last;

b) with each reading operation of data from the FIFO store (30), a read pointer (LZ) is set to a value which designates the storage stage which is subsequently to be read, whereby the reading process always comprises the reading of data from i×N storage stages, i being an integer and i×N<n;

c) a trigger pointer (TZ) is set to a value j×N, j being an integer, j×N<n and i≦j;

d) if, after a write process, the value of the write pointer (SZ) is equal to or greater than the value of the trigger pointer (TZ), a read operation is allowed;

e) after each read operation the value of the trigger pointer (TZ) is increased by one trigger step (TZ) of k×N, where k is an integer and k×N<n; and f) when the value of the write pointer (SZ) reaches the value of the read pointer (LZ), the value of the read pointer (LZ) and the value of the trigger pointer (TZ) will be increased by N.

3 Claims, 2 Drawing Sheets

*FIG. 2*
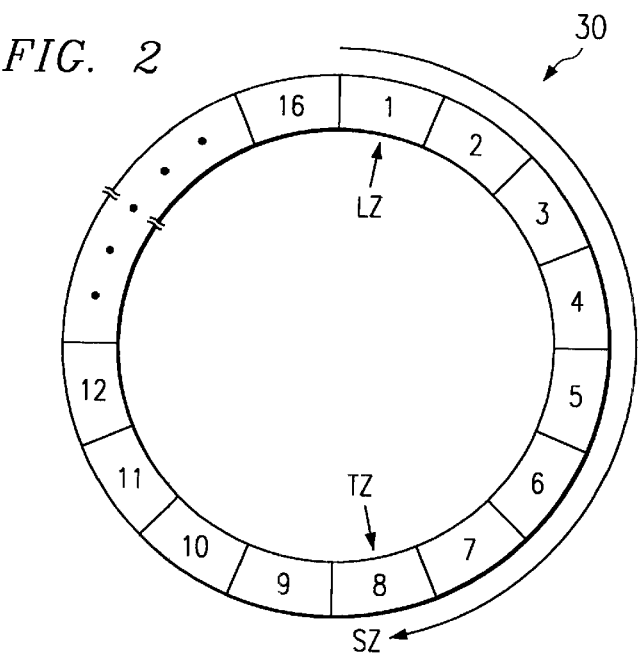
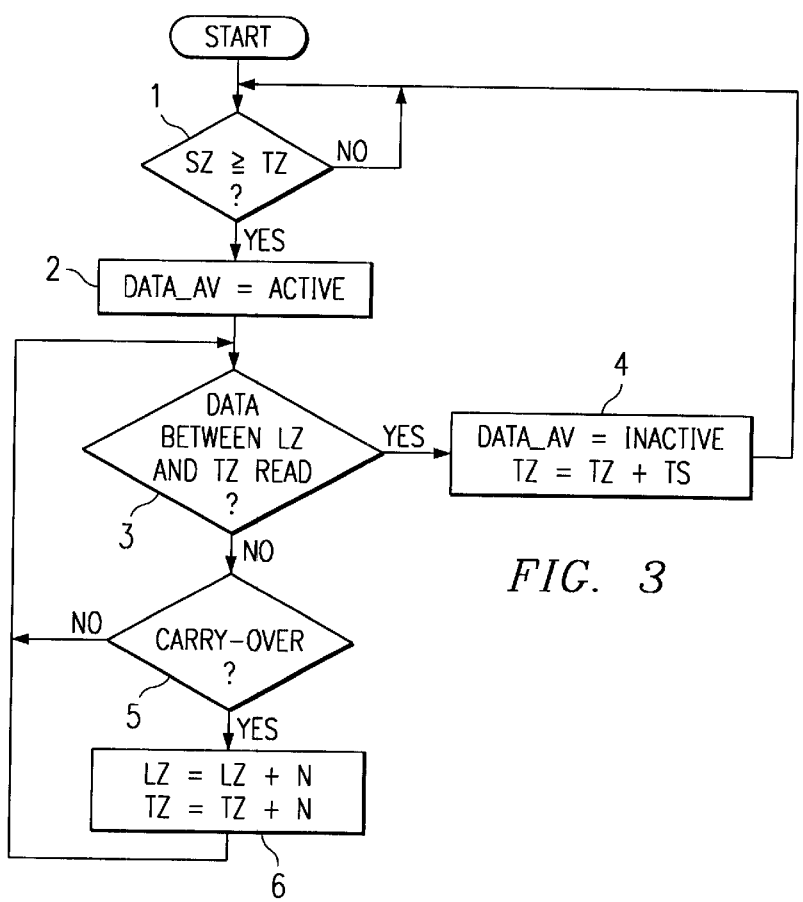
*FIG. 3*

INCREASING VALUES OF A READ AND A TRIGGER POINTERS WHEN A WRITE POINTER REACHES THE READ POINTER IN A CIRCULAR FIFO (FIRST-IN-FIRST-OUT) STORE

The invention relates to a procedure for the transfer of data from N channels, which are sampled in a pre-determined sequence, to a processor by means of a circular FIFO store with n storage stages, whilst retaining this pre-determined sequence, whereby the output of the last stage is connected to the input of the first stage.

It is known that a circular FIFO memory, also known as a FIFO ring store, may be used as an intermediate storage device for the transfer of data. An example of such a FIFO ring store is described in the publication "Halbleiterschaltungstechnik" (Semiconductor circuit technology) by U. Tietze and Ch. Schenk, 9th edition, page 286. The write and read processes are controlled by a write pointer (input pointer) and a read pointer (output pointer), respectively, which in each case indicate into which storage stage data may be written and from which storage stage data may be read. Once this FIFO store is full, no further data must be input, as otherwise data may be overwritten which have not yet been read. Situations may be imagined where an overwriting process is harmless, but the known ring store does not make provision for measures which would permit such innocuous overwriting. Since no overwriting of any store contents is allowed, not much flexibility exists when considered in conjunction with a processor with which the data will have to be further processed. In the case of the known FIFO ring store no measures are taken which will ensure that a processor will always read from a block from a pre-determined number of consecutive storage stages, as there is no guarantee that the block contains current data and that the reading process starts in the first stage of the block and that it ends with the last stage of the block.

Reading a block of connected data values is already being used in a type MAX125 or MAX 126 data acquisition circuit from Messrs. MAXIM. This circuit provides four input channels by means of which an input signal can be sampled. The sampling values are stored in an intermediate store which comprises four stages, and which collects the sampling values in their successive sampling order. The four sampling values now form a block which may subsequently be read by a processor. Since only four sampling values can be stored, the processor must execute a read process whenever the store is full. This means that the processor is time-restricted as regards its processing cycle, as it may well be desirable to execute read operations at longer intervals, that is intervals which are greater than the time difference between two successive signal sampling operations at the four input channels. Even with this known data transfer process, the processor is limited in its flexibility with respect to the read operations of the data required by it.

The invention rests on the requirement to provide a procedure for the transfer of data, the use of which will enhance the flexibility with respect to the temporal control of reading processes by a processor without loss of data integrity.

This requirement is met by a procedure for the transfer of data sampled from N channels in a pre-determined sequence, to a processor by means of a circular FIFO store with n storage stages, whilst retaining this pre-determined sequence, whereby the output of the last stage is connected to the input of the first stage, by implementing the following steps:

a) With each write operation of data into the FIFO store, a write pointer is set to a value which designates the storage stage into which has been written last;

b) with each reading operation of data from the FIFO store, a read pointer is set to a value which designates the storage stage which is subsequently to be read, whereby the reading process always comprises the reading of data from $i \times N$ storage stages, $i$ being an integer and $i \times N < n$;

c) a trigger pointer is set to a value $j \times N$, $j$ being an integer, $j \times N < n$ and $i < j$;

d) if, after a write process, the value of the write pointer is equal to or greater than the value of the trigger pointer, a read operation is allowed;

e) after each read operation the value of the trigger pointer is increased by one trigger step of $i \times N$, and f) when the value of the write pointer reaches the value of the read pointer, the value of the read pointer and the value of the trigger pointer will be increased by N.

By the use of the procedure according to the invention, once a read process has been allowed, a processor can read and further process one or more data blocks contained in successive stages of a store. Even if any data stored are overwritten by newly arrived data, on account of the circular structure of the FIFO storage device and because of the relatively large temporal separation between two read operations, the use of the trigger pointer and the forward stepping of the read pointer ensure that, for the next read operation, the processor will always start at the storage stage containing the first data value of a data block, and in this way guarantee the continued coherence between the signals derived from the channels sampled and the signals read by the processor. Considerable flexibility on the part of the processor is therefore ensured with respect to the temporal control of the read operations.

Advantageous further developments of the invention are indicated in the sub-claims.

The invention shall now be explained by example of the drawing, where

FIG. 1 shows an example of a circuit arrangement with which the data transfer procedure according to the invention can be used, FIG. 2 is a schematic representation of a circular FIFO storage device, and FIG. 3 is a flow diagram illustrating the write and read processes taking place in the storage device of FIG. 2.

The circuit arrangement 10 represented in FIG. 1 is an analogue-to-digital converter with four analogue input channels 12, which can convert the analogue signals fed to these channels into digital signals. These signals can be read from the data outputs 14 and further processed by a processor not shown in the diagram.

The precise arrangement of the analogue-to-digital converter illustrated is immaterial as far as the here to be described invention is concerned, so that only its essential components shall be briefly mentioned and explained in this context. As can be seen, instantaneous value stores 16 to 22 are provided for the sampling of the signals fed to the four input channels 12, which are known as sample and hold circuits and therefore given the designation S/H. The sampling variables output by these sample and hold circuits are fed via a multiplexer 24 to the converter circuit 26 proper, which can be provided with reference voltages from a reference voltage source 28. The output signals then reach the data outputs 14 via a FIFO store 30 and a buffer store 32. The FIFO store 30 is a circular FIFO store, or a ring store, reference to which will be made later on.

The functional sequence within the analogue-to-digital converter is controlled by a control logic 34 and a control register 36. The control logic 34 has control signal inputs 38 by which control signals can be fed to it, which in turn initiate specific processes in the control logic 34.

FIG. 2 is a schematic representation of the FIFO store 30, where it can be seen that the storage stages are in a circular arrangement, which means that the output of the last stage is connected to the input of the first stage. As is known, a FIFO storage device in its simplest form is a shift register comprising n stages, whereby the data are fed to the input of the first stage, and where the data are output from the output of the last stage.

Each input of a new data value initiates a shift process, causing the data values to be shifted, one after the other, from the first stage to the last stage. This arrangement ensures that the data which are input first will also be the first to be output. The sequence of the data at the output therefore corresponds exactly to the sequence with which they have been fed to the input. The special feature of the FIFO store 30 of FIG. 2 consists in that its stages are in a circular arrangement, that is ring-shaped, where the output of the last stage is connected to the input of the first stage. In FIG. 2 it is assumed that, for the purpose of the following description, 16 storage stages have been provided, but the number of stages may generally be taken as n, with the proviso that n=16. It is known that FIFO ring stores make use of a read pointer or a write pointer, respectively, to control the read and write operations. These pointers can be realised in their simplest form by counters which, in the example described, can assume a total of 16 counter positions. The counter position in each case "points" to one of the stages of the storage device. The write pointer thereby indicates into which stage the last write operation has been written, whilst the read pointer indicates from which stage may be read during the next read operation.

When there is a request from the processor that during each read operation an entire data block of the data values should be read, which have been generated by the succeeding sampling of the four input channels 12, it is not sufficient to provide a read pointer and a write pointer to make it possible to read the data block by block. It could happen, after all, that the processor will already want to read data before a complete block of four data values is available in the FIFO store 30.

For this reason, a further pointer, a so-called trigger pointer, is provided which points to a storage stage which is an even multiple of the number of the input channels 12. In the case of the example shown, the trigger pointer points to the eighth storage stage. By means of the control logic 34, which sets and monitors the different pointers, it is possible to determine when, after starting the write operation into the FIFO store 30, the eighth storage stage has been written into, that is the value of the trigger pointer is equal to the value of the write pointer. Only when this condition is fulfilled, that is when the write pointer becomes equal or even greater than the trigger pointer, the reading operation is enabled. This ensures that the processor can execute a read operation only when two complete data blocks of four data values each are already present in the FIFO store 30. The processor is therefore in a position to read these two data blocks, should this be desirable. The occurrence of this condition and the corresponding enabling of the read operation is indicated by an output signal at the output 40, which is interrogated by the processor at regular intervals.

The trigger pointer could, of course, also be set to the fourth or the twelfth storage stage, to enable the read operation to take place already after writing the fourth storage stage or, respectively, only after writing the twelfth storage stage, by providing the corresponding signal at the output 40.

After reading a data block from the data values stored in eight succeeding storage stages, the read pointer shows 9, that is sets from 1 to 9, so that the following read operation starts at the ninth storage stage. After each read operation, the value of the trigger pointer is increased by one trigger step, which corresponds to an even multiple of the number of input channels, but must not be greater than the number of available storage stages, and not smaller than the number of the previously read storage stages. In the example described, the trigger step has the value 8, so that the trigger pointer points to the 16th storage stage when the read operation is completed. Since, in the assumed case, the write pointer has not been advanced to the 16th storage stage, no further read operation can be executed by the processor, since reading is not enabled. Only when the value of the write pointer coincides with the value of the newly set trigger pointer, can the following data blocks be read.

The interaction of the pointers ensures at any time that always complete data blocks of four data values are available for reading, which have been generated by successive sampling of the four input channels 12. In general terms, this interaction of the pointers may be defined as follows:

Let it be assumed that with a FIFO store of n storage stages i×N storage stages are read in each reading operation, where N is the number of input channels, whilst i is an integer and i×N<n.

During an initialisation process at the start of the proceedings, the trigger pointer TZ is set to a value j×N, where j is an integer j×N<n i≦j.

After each read operation the trigger pointer TZ is advanced by one trigger step TS of i×N.

The use of the three pointers for the control of the write and read operations also makes it possible to overwrite data in the store without loosing the correlation between the stored data blocks and the data sampled at the input channels. This overwriting of data can take place when the processor does not require data from the FIFO store 30 for a long period of time, so that, when continuously writing into the store, the write pointer is set once more from the sixteenth storage stage to the first storage stage. The overwritten data will thereby, of course, be lost and will be replaced by current data, but there are applications in which the processor only requires current data in each case, or where the data are so redundant that the overwriting of some old data does not impede further processing.

In order to make sure that the correlation between the stored data and the data sampled by the input channels does not become lost, a checking process is first initiated which establishes that overwriting is to commence. This checking process consists in that the read pointer is compared with the write pointer. When the value of the write pointer becomes equal to the value of the read pointer, this then shows that writing takes place into a storage stage which has not yet been read. In this case overwriting of the storage stage with current data will commence. As soon as this condition is detected, the value of the read pointer is increased by the number of input channels, that is in the following example by four, so that it points to the fifth storage stage. This means that in the event of a possible next read operation, reading will start with the data in the fifth storage stage, that is with the first data value of a data block, which is stored in the storage stages 5 to 8. At the same time the value of the trigger pointer is also increased by the number of input channels, to ensure that the next read operation will only be enabled when a complete data block for reading is available in the store.

The data transmission process, using the FIFO store 30, is illustrated with the help of the flow diagram in FIG. 3.

In step 1, after starting, a check is made to establish whether the value of the write pointer SZ is greater than or equal to the value of the trigger pointer TZ. This checking process continues until the condition is met. In step 2, if the condition is met, a signal $DATA_{13}$ AV at output 40 is put into its active state, which signals to the processor that reading is allowed.

In step 3 a check is made as to whether the data block or blocks between the storage block indicated by the read pointer and the storage block indicated by the trigger pointer have been read. This check can be realised by comparing the value of the read pointer, which for each reading of a storage stage is advanced by 1, with the value of the trigger pointer. If these storage blocks have been read, in step 4 the signal $DATA_{13}$ AV is put into its inactive state, and the trigger pointer is set to a new value which results from the sum of the previous value and the trigger step TS. After returning to step 1, again a check is made as to whether the value of the write pointer is greater than or equal to the value of the trigger pointer and, if applicable, steps 2, 3 and 4 are once again executed.

If, in step 3, it has been established that no read operation has taken place, then a check will be made in step 5 as to whether a carry-over has already taken place, that is whether the state has been reached where the value of the write pointer SZ has become equal to the value of the read pointer LZ. If no carry-over has occurred, the functional sequence returns to step 3 and, again, a check is made as to whether a read operation has taken place. If, however, a carry-over has occurred, that is data have been overwritten into a storage stage which has not yet been read, then both the value of the read pointer as well as the value of the trigger pointer are increased by the number of the input channels.

By the interaction of the read pointer, the write pointer and the trigger pointer in a circular FIFO storage device, a very flexible procedure for the transfer of data from input channels to output channels is obtained, which allows the processor to read the data asynchronously whilst keeping the data integrity intact.

What is claimed is:

1. Process for the transfer of data from N channels, which are sampled in a pre-determined sequence, to a processor by means of a circular FIFO store with n storage stages, while retaining this pre-determined sequence, whereby the output of the last stage is connected to the input of the first stage, comprising the following steps:

a) With each write operation of data into the FIFO store, a write pointer (SZ) is set to a value which designates the storage stage into which has been written last;

b) with each reading operation of data from the FIFO store (30), a read pointer (LZ) is set to a value which designates the storage stage which is subsequently to be read, whereby the reading process always comprises the reading of data from i×N storage stages, i being an integer and i×N<n;

c) a trigger pointer (TZ) is set to a value j×N, j being an integer, j×N<n and i<=j;

d) if, after a write process, the value of the write pointer (SZ) is equal to or greater than the value of the trigger pointer (TZ), a read operation is allowed;

e) after each read operation the value of the trigger pointer (TZ) is increased by one trigger step (TS) of i×N, and f) when the value of the write pointer (SZ) reaches the value of the read pointer (LZ), the value of the read pointer (LZ) and the value of the trigger pointer (TZ) will be increased by N.

2. Process according to claim 1, wherein the data to be transferred are analogue data which are sampled at four channels and converted into digital data in an analogue-to-digital converter, whereby the converted digital data are stored in the sequence of channel sampling in the FIFO storage device (30), which allows for the storage of four blocks of four converted digital data each, one after the other.

3. Process according to claim 2, wherein the trigger pointer (TZ) is first set to the value eight, so that the read operation from the FIFO storage device (30) is enabled for the first time when data are written into the eighth storage stage, and that the value of the trigger pointer (TZ) is increased after each read operation by at least four, so that in a subsequent read operation data from at least four consecutive storage stages can be read.

* * * * *